US010217970B2

(12) United States Patent
Kuniya et al.

(10) Patent No.: US 10,217,970 B2
(45) Date of Patent: Feb. 26, 2019

(54) STEEL PLATE FOR FORMING BATTERY CAN AND ALKALINE BATTERY

(71) Applicant: FDK CORPORATION, Tokyo (JP)

(72) Inventors: Shigeyuki Kuniya, Tokyo (JP); Takuya Suzuki, Tokyo (JP)

(73) Assignee: FDK CORPORATION, Tokyo (JP)

( * ) Notice: Subject to any disclaimer, the term of this patent is extended or adjusted under 35 U.S.C. 154(b) by 15 days.

(21) Appl. No.: 15/717,960

(22) Filed: Sep. 28, 2017

(65) Prior Publication Data
US 2018/0019446 A1 Jan. 18, 2018

Related U.S. Application Data

(63) Continuation of application No. PCT/JP2016/053397, filed on Feb. 4, 2016.

(30) Foreign Application Priority Data

Mar. 31, 2015 (JP) ................................ 2015-073813

(51) Int. Cl.
*H01M 2/02* (2006.01)
*B32B 15/01* (2006.01)
(Continued)

(52) U.S. Cl.
CPC ............. *H01M 2/02* (2013.01); *B32B 15/015* (2013.01); *C22C 38/00* (2013.01); *C25D 5/50* (2013.01);
(Continued)

(58) Field of Classification Search
CPC combination set(s) only.
See application file for complete search history.

(56) References Cited

U.S. PATENT DOCUMENTS 4,178,417 A * 12/1979 Oda .................... B23K 20/227
148/530
6,165,640 A * 12/2000 Sugikawa .............. B21D 22/21
429/164
(Continued)

FOREIGN PATENT DOCUMENTS

EP 0809307 A2 11/1997
JP H09-306439 A 11/1997
(Continued)

OTHER PUBLICATIONS

The Extended European Search Report for Application No. 16771888.1 dated Sep. 19, 2018.
(Continued)

*Primary Examiner* — Kaity V Chandler
(74) *Attorney, Agent, or Firm* — Isshiki International Law Office; Joseph P. Farrar, Esq.

(57) ABSTRACT

A battery can forming steel plate that configures an electrode can (a positive electrode can) of an alkaline battery and is to be formed into a battery can by presswork, the steel plate as a base material includes an iron and nickel diffusion layer or an iron and nickel-cobalt alloy diffusion layer that is formed by forming a nickel plated layer or a nickel-cobalt alloy plated layer with a thickness of 0.5 to 2.0 μm on an inner surface of a battery can of a steel plate (base material steel plate) as a base material, and subsequently performing heat diffusion treatment on the nickel plated layer or the nickel-cobalt alloy plated layer. An average number of crystal grains per 0.25 mm² unit area of the steel plate as the base material is equal to or more than 12.3.

3 Claims, 2 Drawing Sheets

(51) Int. Cl.
*C25D 5/50* (2006.01)
*C25D 7/00* (2006.01)
*C22C 38/00* (2006.01)
*H01M 6/08* (2006.01)
*H01M 10/24* (2006.01)
*H01M 6/04* (2006.01)

(52) U.S. Cl.
CPC .............. *C25D 7/00* (2013.01); *H01M 2/026* (2013.01); *H01M 2/0287* (2013.01); *H01M 2/0292* (2013.01); *H01M 6/04* (2013.01); *H01M 6/08* (2013.01); *H01M 6/085* (2013.01); *H01M 10/24* (2013.01); *B32B 2457/10* (2013.01)

(56) References Cited

U.S. PATENT DOCUMENTS

| | | | | |
|---|---|---|---|---|
| 6,559,583 | B1* | 5/2003 | Kanayama | C22C 38/004 313/402 |
| 2004/0206427 | A1* | 10/2004 | Iseda | C21D 6/004 148/609 |
| 2005/0244712 | A1 | 11/2005 | Miyamoto et al. | |
| 2006/0292441 | A1* | 12/2006 | Ushijima | H01M 2/027 429/174 |
| 2008/0026287 | A1 | 1/2008 | Adachi et al. | |
| 2013/0167980 | A1* | 7/2013 | Kawata | C21D 8/0226 148/504 |

FOREIGN PATENT DOCUMENTS

| | | |
|---|---|---|
| JP | H11-111243 A | 4/1999 |
| JP | 2002-060899 A | 2/2002 |
| JP | 2007-009272 A | 1/2007 |
| JP | 2007-335205 A | 12/2007 |
| JP | 2011-058036 A | 3/2011 |
| JP | 2014-009401 A | 1/2014 |

OTHER PUBLICATIONS

International Search Report (ISR) for Application No. PCT/JP2016/053397 dated May 17, 2016.
Translation of International Search Report (ISR) for Application No. PCT/JP2016/053397 dated May 17, 2016.
Written Opinion of the International Search Authority for Application No. PCT/JP2016/053397 dated May 17, 2016.
Partial translation of Written Opinion of the International Search Authority for Application No. PCT/JP2016/053397 dated May 17, 2016.
"Steels-Micrographic determination of the apparent grain size", JIS Handbook 2007, Jan. 2007, pp. 644, 649 to 650, 665.
Partial translation of "Steels-Micrographic determination of the apparent grain size", JIS Handbook 2007, Jan. 2007, pp. 644, 649 to 650, 665.

* cited by examiner

STEEL PLATE FOR FORMING BATTERY CAN AND ALKALINE BATTERY

CROSS-REFERENCE TO RELATED APPLICATIONS

This patent application is a continuation of International Application PCT/JP2016/053397, with an international filing date of Feb. 4, 2016, which in turn claims priority to Japanese Patent Application No. 2015-073813, filed on Mar. 31, 2015 in the Japan Patent Office, the entire disclosures of which are hereby incorporated by reference herein.

TECHNICAL FIELD

The present disclosure relates to a steel plate for forming a battery can and an alkaline battery.

BACKGROUND ART

After the Great East Japan Earthquake, there have been increasing cases of storing alkaline batteries over a long period of time for the purpose of disaster prevention usage and similar usage in our country. Thus, a demand for improving leakage resistance of the alkaline battery is increasing. Meanwhile, in association with improved performances and downsizing of electronic devices, such as digital cameras, video cameras, mobile phones, and smart phones recently, there is increasing demand for the alkaline battery to improve heavy load discharge performance.

SUMMARY

This specification describes an improved steel plate for forming a battery can. The steel plate for forming the battery can is to be formed into the battery can by presswork. The steel plate for forming the battery can includes an iron and nickel diffusion layer or an iron and nickel-cobalt alloy diffusion layer formed by forming a nickel plated layer or a nickel-cobalt alloy plated layer with a thickness of 0.5 to 2.0 μm on an inner surface of a battery can of a steel plate as a base material, and subsequently performing heat diffusion treatment on the nickel plated layer or the nickel-cobalt alloy plated layer. An average number of crystal grains per 0.25 $mm^2$ unit area of the steel plate as the base material is equal to or more than 12.3.

This specification further describes an improved alkaline battery configured by including a battery can in the shape of a cylinder with a closed bottom. The battery can is configured by using the above-described steel plate for forming the battery can. The alkaline battery includes a positive electrode can, a positive electrode mixture, a separator, a negative electrode mixture, a negative electrode current collector, a negative electrode terminal plate, and an alkaline electrolyte. The positive electrode mixture has a hollow cylindrical shape disposed coaxial with the positive electrode can and inside the positive electrode can. The separator is housed in the positive electrode can. The negative electrode mixture fills in an inner peripheral side of the separator. The negative electrode current collector is inserted into the negative electrode mixture. The negative electrode terminal plate is disposed to an opening of the positive electrode can.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

Figure 1:
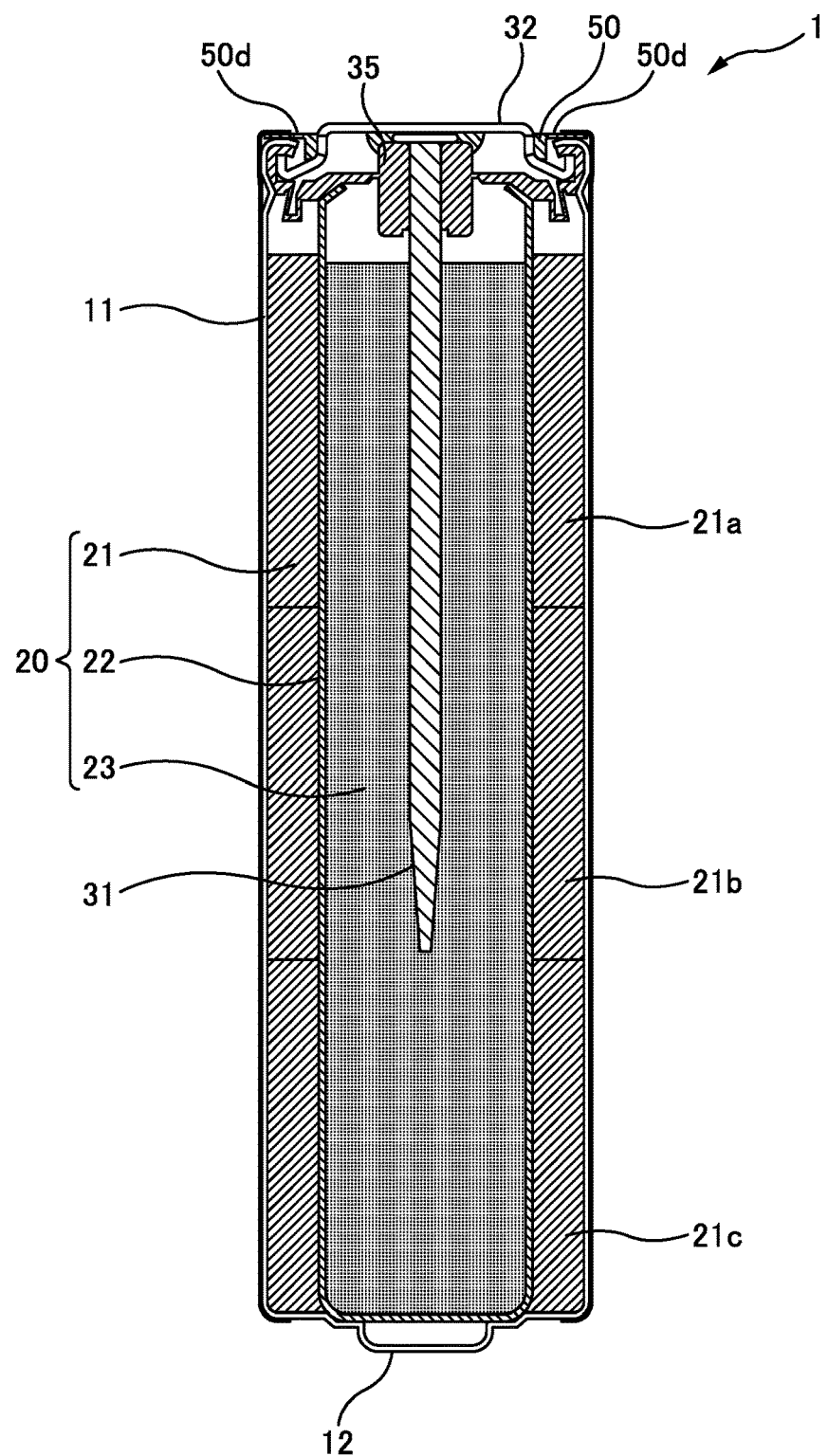
FIG. 1 is a drawing illustrating a configuration of a cylindrical alkaline battery.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, a steel plate for forming a battery can and an alkaline battery according to embodiments of the present disclosure are described. As used herein, the singular forms "a", "an", and "the" are intended to include the plural forms as well, unless the context clearly indicates otherwise.

As a material of a battery can, a steel plate (such as Nickel Plated Steel (NPS)) that generally includes a corrosion resistant plated layer, such as nickel plate, on a surface is used in order to ensure good leakage resistance. Here, the steel plate is composed principally of iron. However, the iron reacts with, for example, nickel, manganese dioxide, and oxygen, and dissolves. Therefore, a method, for example, of thickening the plated layer (such as a nickel plated layer) provided on the inner surface of the battery can and decreasing an average diameter of crystal grains of the steel plate, is effective to improve the leakage resistance of the alkaline battery.

On the other hand, in order to improve the heavy load discharge performance of the alkaline battery, it is effective to make the inner surface of the battery can rough (increase the average diameter of the crystal grains of the steel plate) to expose the iron and reduce the contact resistance with a power generating element (such as an electrode active material) housed in the battery can. However, increasing an exposure amount of the iron lowers the leakage resistance.

Thus, it has not always been easy to achieve both the leakage resistance improvement and the heavy load discharge performance improvement of the alkaline battery.

The present disclosure describes an embodiment of an alkaline battery having superior leakage resistance and heavy load discharge performance.

FIG. 1 illustrates a configuration (hereinafter referred to as an alkaline battery 1) of a common cylindrical alkaline battery (LR6 type (AA size) alkaline battery) that is an application target of the present disclosure. It should be noted that in FIG. 1, the alkaline battery 1 is illustrated as a vertical cross-sectional view (a cross-sectional view when an extension direction of a cylinder axis of the alkaline battery 1 is an up-down (vertical) direction).

As illustrated in FIG. 1, the alkaline battery 1 includes a battery can, a separator 22, a negative electrode mixture 23, a negative electrode terminal plate 32, and a negative electrode current collector 31. The battery can (hereinafter referred to as a positive electrode can 11) is made of metal and is in the shape of a cylinder with a closed bottom. The separator 22 is in the shape of a circular cylinder with a closed bottom and is disposed in an inner peripheral side of a positive electrode mixture 21 (constituted of three pellets 21a to 21c in hollow cylindrical shapes) that is inserted into the positive electrode can 11. The negative electrode mixture 23 fills in an inner peripheral side of the separator 22. The negative electrode terminal plate 32 is fitted to an opening of the positive electrode can 11 via a sealing gasket 35 made of resin. The negative electrode current collector 31 is in the shape of a rod and made of a material, such as brass. The negative electrode current collector 31 is fixedly secured to the inside of the negative electrode terminal plate 32 by, for example, spot welding. The positive electrode mixture 21, the separator 22, and the negative electrode mixture 23 constitute a power generating element 20 of the alkaline battery 1.

The positive electrode can 11 has a conductive property. The positive electrode can 11 is formed, for example, by pressing a metal material, such as a nickel plated steel plate. The positive electrode can 11 doubles as the positive electrode current collector and the positive electrode terminal. The positive electrode can 11 has a bottom portion at which a convex shaped positive electrode terminal portion 12 is integrally formed.

The three pellets 21a to 21c, which constitute the positive electrode mixture 21, have identical shapes and sizes. Components of these are common. The components include, for example: electrolytic manganese dioxide (EMD) as a positive-electrode active material; graphite as a conductive material; polyacrylic acid as a binder; an electrolyte containing mainly of potassium hydroxide (KOH); and a surfactant (for example, an anionic surfactant). It should be noted that in this embodiment, as the three pellets 21a to 21c, a product produced by the following method is used. The electrolytic manganese dioxide (EMD), the graphite, and the polyacrylic acid are mixed (dry blending) to obtain the mixture. The electrolyte (KOH solution of 40 mass %) containing mainly of the potassium hydroxide (KOH) and the surfactant (liquid) are mixed (wet blending) to the obtained mixture. Furthermore, after the mixture is processed through processes, such as rolling, disintegration, granulation, and classification, the mixture is compressed and shaped into a ring-shape.

As illustrated in FIG. 1, in the positive electrode can 11, the three pellets 21a, 21b, and 21c are laminated in a vertical direction and press-fitted such that cylinder axes of the three pellets 21a, 21b, and 21c are coaxial with a cylinder axis of the positive electrode can 11. At least a part of outer peripheral surfaces of the three pellets 21a, 21b, and 21c are in contact with the positive electrode can 11.

The negative electrode mixture 23 is zinc alloy powders as a negative electrode active material that has been gelatinized. The zinc alloy powders are made by a gas atomization method or a centrifugal spray method. The zinc alloy powders include zinc, alloy components (such as bismuth, aluminum, and indium) added for the purpose of suppressing a generation of gas (leakage prevention) or similar purpose, and potassium hydroxide (KOH) as an electrolyte. The negative electrode current collector 31 penetrates a center of the negative electrode mixture 23.

Steel Plate for Forming Battery Can (Positive Electrode Can)

According to this embodiment, the alkaline battery 1, which has excellent leakage resistance and heavy load discharge, includes a steel plate for forming a battery can (the positive electrode can 11) having the following configuration.

Figure 2:
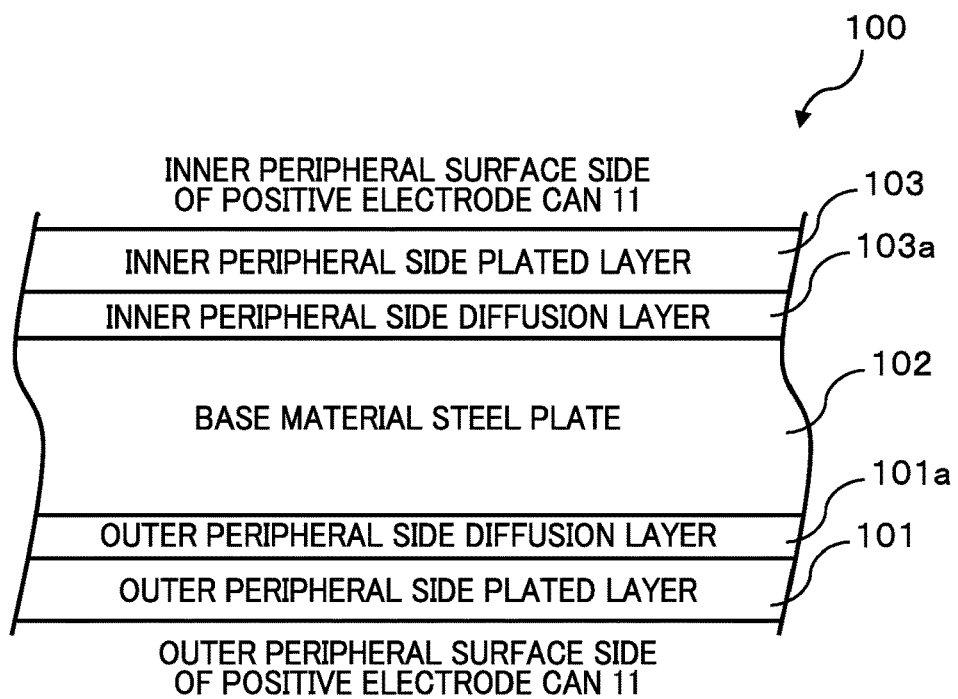
FIG. 2 is a drawing illustrating a layer structure of a battery can forming steel plate after heat diffusion treatment.

FIG. 2 illustrates a layer structure of a steel plate (hereinafter referred to as a battery can forming steel plate 100) used for the alkaline battery 1 (a partial cross-sectional view of the battery can forming steel plate 100). In FIG. 2, a lower side of the paper corresponds to an outer peripheral surface side of the positive electrode can 11 and an upper side on the paper corresponds to an inner peripheral surface side of the battery can 11.

As illustrated in FIG. 2, the battery can forming steel plate 100 has a structure that laminates an outer peripheral side plated layer 101, an outer peripheral side diffusion layer 101a, a steel plate (hereinafter referred to as a base material steel plate 102) that serves as a base material of the battery can forming steel plate 100, an inner peripheral side diffusion layer 103a, and an inner peripheral side plated layer 103 in this order from the lower side toward the upper side on the paper.

The base material steel plate 102 is, for example, a cold-rolled steel plate (such as, low carbon aluminum killed steel, ultra-low carbon steel, and non-aging ultra-low carbon steel) excellent for presswork (such as deep drawn presswork). A layer thickness of the base material steel plate 102 is, for example, approximately 0.20 to 0.30 mm. The base material steel plate 102 is manufactured by, for example, the following method. After a hot-rolled plate is pickled and an oxide film (scale) is removed, cold-rolling is performed and the rolling oil is electrolytically cleaned. Afterwards, annealing (continuous annealing and box annealing) and temper rolling are performed.

Figure 3:
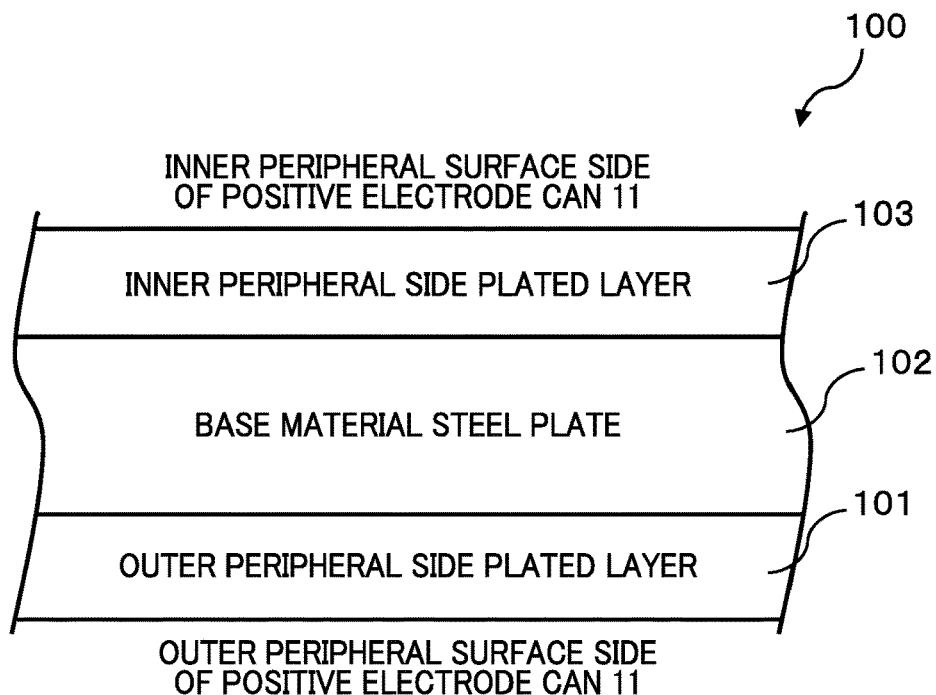
FIG. 3 is a drawing illustrating a layer structure of the battery can forming steel plate before the heat diffusion treatment.

As illustrated in FIG. 2, the outer peripheral side diffusion layer 101a and the inner peripheral side diffusion layer 103a in the battery can forming steel plate 100 are, as illustrated in FIG. 3, both formed by performing the heat diffusion treatment after the plated layers (the outer peripheral side plated layer 101 and the inner peripheral side plated layer 103) are formed on surfaces of the base material steel plate 102 (an iron and nickel diffusion layer or an iron and nickel-cobalt alloy diffusion layer is formed). It should be noted that the above-described plated layer (the outer peripheral side plated layer 101 and the inner peripheral side plated layer 103) are formed by, for example, using a plating bath (a nickel alloy plating bath or a nickel-cobalt alloy plating bath). The above-described heat diffusion treatment is performed, for example, by the continuous annealing method and the box annealing method under a predetermined condition (heat treatment temperature, heat treatment processing time).

It should be noted that the diffusion layer (heat diffusion layer) is only needed to be formed at least on the inner peripheral surface side of the positive electrode can 11 where the battery element 20 (the positive electrode mixture 21) contacts the positive electrode can 11. The outer peripheral surface side of the positive electrode can 11 does not necessarily have a configuration similar to the inner peripheral surface side. For example, the outer peripheral surface side of the positive electrode can 11 may include a nickel plated layer instead of the diffusion layer.

Tests

For the battery can forming steel plate 100 having the above-mentioned configuration, in order to find one that ensures both the leakage resistance improvement and the heavy load discharge performance improvement of the alkaline battery 1 at the same time, the inventors manufactured a plurality of kinds of the battery can forming steel plates 100 that have varied average numbers of the crystal grains of the base material steel plates 102 (crystal grain diameters of the base material steel plates 102) and varied thicknesses of the inner peripheral side plated layers 103 before the heat diffusion treatment. The inventors then manufactured a plurality of samples of the alkaline battery 1 using the positive electrode cans 11 manufactured using the respective battery can forming steel plates 100, and examined the leakage resistance and the heavy load discharge performance for the respective samples.

It should be noted that every sample described above included the base material steel plate 102 of the positive electrode can 11 with a thickness of 0.25 mm. Every sample described above included the outer peripheral side plated layer 101 before the heat diffusion treatment with a thickness of 1.5 μm. Every sample described above included the outer peripheral side plated layer 101 whose composition was common to a composition (nickel or nickel-cobalt alloy) of the inner peripheral side plated layer 103 on the inner peripheral surface.

Leakage Resistance Test

First, each of the manufactured samples was stored for 100 days under drying at 70° C., and leakage resistance characteristics were examined for the respective samples. The test results of when the inner peripheral side diffusion layers 103a were the iron and nickel diffusion layers (when the inner peripheral side plated layers 103 before the heat diffusion treatment (FIG. 3) were the nickel plated layers) are shown in Table 1. The test results of when the inner peripheral side diffusion layers 103a were the iron and nickel-cobalt alloy diffusion layers (when the inner peripheral side plated layers 103 before the heat diffusion treatment (FIG. 3) were the nickel-cobalt alloy plated layers) are shown in Table 2.

In Table 1 and Table 2, "Average Number of Crystal Grains" is an average number of the crystal grains per unit area (area of 0.25 mm² (square shape)) on a section plane of the base material steel plate 102. In Table 1 and Table 2, "Good" is given when leakage was not visually confirmed and "Poor" is given when the leakage was visually confirmed.

TABLE 1

| Average Number of Crystal Grains | Thickness of Inner Peripheral Side Plated Layer 103 (Nickel Plated Layer) (μm) | | | | | | | | | | |
|---|---|---|---|---|---|---|---|---|---|---|---|
| | 0.4 | 0.5 | 0.7 | 0.9 | 1.0 | 1.1 | 1.3 | 1.5 | 1.7 | 2.0 | 2.1 |
| 14.0 | Poor | Good | Good | Good | Good | Good | Good | Good | Good | Good | Good |
| 13.5 | Poor | Good | Good | Good | Good | Good | Good | Good | Good | Good | Good |
| 13.4 | Poor | Good | Good | Good | Good | Good | Good | Good | Good | Good | Good |
| 13.2 | Poor | Good | Good | Good | Good | Good | Good | Good | Good | Good | Good |
| 13.0 | Poor | Good | Good | Good | Good | Good | Good | Good | Good | Good | Good |
| 12.5 | Poor | Good | Good | Good | Good | Good | Good | Good | Good | Good | Good |
| 12.3 | Poor | Good | Good | Good | Good | Good | Good | Good | Good | Good | Good |
| 12.0 | Poor | Poor | Poor | Poor | Poor | Poor | Poor | Poor | Poor | Poor | Poor |
| 11.6 | Poor | Poor | Poor | Poor | Poor | Poor | Poor | Poor | Poor | Poor | Poor |

TABLE 2

| Average Number of Crystal Grains | Thickness of Inner Peripheral Side Plated Layer 103 (Nickel-cobalt alloy plated layer) (μm) | | | | | | | | | | |
|---|---|---|---|---|---|---|---|---|---|---|---|
| | 0.4 | 0.5 | 0.7 | 0.9 | 1.0 | 1.1 | 1.3 | 1.5 | 1.7 | 2.0 | 2.1 |
| 14.0 | Poor | Good | Good | Good | Good | Good | Good | Good | Good | Good | Good |
| 13.5 | Poor | Good | Good | Good | Good | Good | Good | Good | Good | Good | Good |
| 13.4 | Poor | Good | Good | Good | Good | Good | Good | Good | Good | Good | Good |
| 13.2 | Poor | Good | Good | Good | Good | Good | Good | Good | Good | Good | Good |
| 13.0 | Poor | Good | Good | Good | Good | Good | Good | Good | Good | Good | Good |
| 12.5 | Poor | Good | Good | Good | Good | Good | Good | Good | Good | Good | Good |
| 12.3 | Poor | Good | Good | Good | Good | Good | Good | Good | Good | Good | Good |
| 12.0 | Poor | Poor | Poor | Poor | Poor | Poor | Poor | Poor | Poor | Poor | Poor |
| 11.6 | Poor | Poor | Poor | Poor | Poor | Poor | Poor | Poor | Poor | Poor | Poor |

From Table 1 and Table 2, in both cases where the inner peripheral side diffusion layers 103a of the battery can forming steel plates 100 were the iron and nickel diffusion layer and the iron and nickel-cobalt alloy diffusion layer, the leakage was not confirmed when the average number of the crystal grains of the base material steel plate 102 was in a range of 12.3 to 14.0 and the thickness of the inner peripheral side plated layer 103 before the heat diffusion treatment (FIG. 3) was in a range of 0.5 to 2.1 μm.

On the other hand, leakage was confirmed when the average number of the crystal grains of the base material steel plate 102 was in a range of 11.6 to 12.0. It is conceivable that this leakage occurs because an exposure amount of the iron on the surface of the battery can forming steel plate 100 increases when the average number of the crystal grains of the base material steel plate 102 decreases (the average grain diameter of the crystal grains increases).

Discharge Characteristic Test

Next, discharge characteristics were examined for the respective samples. The discharge characteristics were examined by performing a cycle discharge test assuming the heavy load discharge, for example, during the use of a digital camera (a cycle of discharge for two seconds at 1500 mW and discharge for 28 seconds at 650 mW was performed ten times per hour (an idle period per hour was 55 minutes)) under a room temperature (20° C.). Then, the number of cycles until reaching a cutoff voltage (1.05 V) was counted.

The results of when the inner peripheral side diffusion layers 103a of the battery can forming steel plates 100 were the iron and nickel diffusion layers (when the inner peripheral side plated layers 103 before the heat diffusion treatment (FIG. 3) were the nickel plated layers) are shown in Table 3. The results of when the inner peripheral side diffusion layers 103a were the iron and nickel-cobalt alloy diffusion layers (when the inner peripheral side plated layers 103 before the heat diffusion treatment (FIG. 3) were the nickel-cobalt alloy plated layers) are shown in Table 4. It should be noted that in Table 3 and Table 4, "Average Number of Crystal Grains" is an average number of crystal grains per unit area (area of 0.25 mm² (square shape)) on a section plane of the base material steel plate 102. In Table 3 and Table 4, a criterion (100%) is set to the discharge performance (the discharge performance of a conventional and general alkaline battery) of when the average number of the crystal grains of the base material steel plate 102 was 11.6 and the thickness of the inner peripheral side plated layer 103 before the heat diffusion treatment (FIG. 3) was 1.0 μm (thick frame portions in Table 3 and Table 4). "Good" is given when the discharge performance is 100±5%, "Excellent" is given when the discharge performance exceeds the upper limit of the above-described range, and "Poor" is given when the discharge performance is less than the lower limit of the above-described range.

TABLE 3

| Average Number of Crystal Grains | Thickness of Inner Peripheral Side Plated Layer 103 (Nickel Plated Layer) (μm) | | | | | | | | | | |
|---|---|---|---|---|---|---|---|---|---|---|---|
| | 0.4 | 0.5 | 0.7 | 0.9 | 1.0 | 1.1 | 1.3 | 1.5 | 1.7 | 2.0 | 2.1 |
| 14.0 | Good | Good | Good | Good | Good | Good | Good | Good | Good | Good | Poor |
| 13.5 | Good | Good | Good | Good | Good | Good | Good | Good | Good | Good | Poor |
| 13.4 | Good | Good | Good | Good | Good | Good | Good | Good | Good | Good | Poor |
| 13.2 | Good | Good | Good | Good | Good | Good | Good | Good | Good | Good | Poor |
| 13.0 | Good | Good | Good | Good | Good | Good | Good | Good | Good | Good | Poor |
| 12.5 | Good | Good | Good | Good | Good | Good | Good | Good | Good | Good | Poor |
| 12.3 | Good | Good | Good | Good | Good | Good | Good | Good | Good | Good | Poor |
| 12.0 | Good | Good | Good | Good | Good | Good | Good | Good | Good | Good | Poor |
| 11.6 | Good | Good | Good | Good | Good | Good | Good | Good | Good | Good | Good |

TABLE 4

| Average Number of Crystal Grains | Thickness of Inner Peripheral Side Plated Layer 103 (Nickel-cobalt alloy plated layer) (μm) | | | | | | | | | | |
|---|---|---|---|---|---|---|---|---|---|---|---|
| | 0.4 | 0.5 | 0.7 | 0.9 | 1.0 | 1.1 | 1.3 | 1.5 | 1.7 | 2.0 | 2.1 |
| 14.0 | Good | Good | Good | Good | Good | Good | Good | Excellent | Excellent | Excellent | Poor |
| 13.5 | Good | Good | Good | Good | Good | Good | Good | Excellent | Excellent | Excellent | Poor |
| 13.4 | Good | Good | Good | Good | Good | Good | Good | Excellent | Excellent | Excellent | Poor |
| 13.2 | Good | Good | Good | Good | Good | Good | Good | Excellent | Excellent | Excellent | Poor |
| 13.0 | Good | Good | Good | Good | Good | Good | Good | Excellent | Excellent | Excellent | Poor |
| 12.5 | Good | Good | Good | Good | Good | Good | Good | Excellent | Excellent | Excellent | Poor |
| 12.3 | Good | Good | Good | Good | Good | Good | Good | Excellent | Excellent | Excellent | Poor |
| 12.0 | Good | Good | Good | Good | Good | Good | Good | Good | Good | Good | Poor |
| 11.6 | Good | Good | Good | Good | Good | Good | Good | Good | Good | Good | Good |

From Table 3 and Table 4, in both cases where the inner peripheral side diffusion layers 103a of the battery can forming steel plates 100 were the iron and nickel diffusion layer and the iron and nickel-cobalt alloy diffusion layer, the discharge performance of equal to or more than 100% was confirmed when the average number of the crystal grains of the base material steel plate 102 was in a range of 11.6 to 14.0 and the thickness of the inner peripheral side plated layer 103 before the heat diffusion treatment (FIG. 3) was in a range of 0.4 to 2.0 µm. When the inner peripheral side diffusion layer 103a was the iron and nickel-cobalt alloy diffusion layer (Table 4), the average number of the crystal grains of the base material steel plate 102 was in a range of 12.3 to 14.0, and the thickness of the inner peripheral side plated layer 103 before the heat diffusion treatment (FIG. 3) was in a range of 1.5 to 2.0 µm, particularly satisfactory results were obtained.

It should be noted that when the thickness of the inner peripheral side plated layer 103 before the heat diffusion treatment (FIG. 3) was 2.1 µm, a sufficient discharge performance could not be obtained except when the average number of the crystal grains of the base material steel plate 102 was 11.6. It is conceivable that this phenomenon is due to an increase of an electrical resistance (contact resistance) caused by the thickened inner peripheral side plated layer 103 before the heat diffusion treatment (FIG. 3) decreasing an exposure amount of the iron on the surface of the battery can forming steel plate 100.

Conclusion

Subsequently, the following Table 5 and Table 6 are made by combining contents of Table 1 to Table 4 in order to perform comprehensive evaluations for the leakage resistance characteristics and the discharge characteristics for the respective cases where the inner peripheral side diffusion layer 103a of the battery can forming steel plate 100 was the iron and nickel diffusion layer and the inner peripheral side diffusion layer 103a was the iron and nickel-cobalt alloy diffusion layer. It should be noted that Table 5 summarizes the results of the leakage resistance characteristic test (Table 1) and the results of the discharge characteristic test (Table 3) for the case where the inner peripheral side diffusion layer 103a was the iron and nickel diffusion layer. Table 6 summarizes the results of the leakage resistance characteristic test (Table 2) and the results of the discharge characteristic test (Table 4) for the case where the inner peripheral side diffusion layer 103a was the iron and nickel-cobalt alloy diffusion layer. In Table 5 and Table 6, "Good" is given when "Good" or "Excellent" is given for both the leakage resistance characteristics and the discharge characteristics (furthermore, "Excellent" is given when "Excellent" is given for the discharge characteristics) and "Poor" is given when "Poor" is given for at least any one of the leakage resistance characteristics and the discharge characteristics.

TABLE 5

| Average Number of Crystal Grains | Thickness of Inner Peripheral Side Plated Layer 103 (Nickel Plated Layer) (µm) | | | | | | | | | | |
|---|---|---|---|---|---|---|---|---|---|---|---|
| | 0.4 | 0.5 | 0.7 | 0.9 | 1.0 | 1.1 | 1.3 | 1.5 | 1.7 | 2.0 | 2.1 |
| 14.0 | Poor | Good | Good | Good | Good | Good | Good | Good | Good | Good | Poor |
| 13.5 | Poor | Good | Good | Good | Good | Good | Good | Good | Good | Good | Poor |
| 13.4 | Poor | Good | Good | Good | Good | Good | Good | Good | Good | Good | Poor |
| 13.2 | Poor | Good | Good | Good | Good | Good | Good | Good | Good | Good | Poor |
| 13.0 | Poor | Good | Good | Good | Good | Good | Good | Good | Good | Good | Poor |
| 12.5 | Poor | Good | Good | Good | Good | Good | Good | Good | Good | Good | Poor |
| 12.3 | Poor | Good | Good | Good | Good | Good | Good | Good | Good | Good | Poor |
| 12.0 | Poor | Poor | Poor | Poor | Poor | Poor | Poor | Poor | Poor | Poor | Poor |
| 11.6 | Poor | Poor | Poor | Poor | Poor | Poor | Poor | Poor | Poor | Poor | Poor |

TABLE 6

| Average Number of Crystal Grains | Thickness of Inner Peripheral Side Plated Layer 103 (Nickel-cobalt alloy plated layer) (µm) | | | | | | | | | | |
|---|---|---|---|---|---|---|---|---|---|---|---|
| | 0.4 | 0.5 | 0.7 | 0.9 | 1.0 | 1.1 | 1.3 | 1.5 | 1.7 | 2.0 | 2.1 |
| 14.0 | Poor | Good | Good | Good | Good | Good | Good | Excellent | Excellent | Excellent | Poor |
| 13.5 | Poor | Good | Good | Good | Good | Good | Good | Excellent | Excellent | Excellent | Poor |
| 13.4 | Poor | Good | Good | Good | Good | Good | Good | Excellent | Excellent | Excellent | Poor |
| 13.2 | Poor | Good | Good | Good | Good | Good | Good | Excellent | Excellent | Excellent | Poor |
| 13.0 | Poor | Good | Good | Good | Good | Good | Good | Excellent | Excellent | Excellent | Poor |
| 12.5 | Poor | Good | Good | Good | Good | Good | Good | Excellent | Excellent | Excellent | Poor |
| 12.3 | Poor | Good | Good | Good | Good | Good | Good | Excellent | Excellent | Excellent | Poor |
| 12.0 | Poor | Poor | Poor | Poor | Poor | Poor | Poor | Poor | Poor | Poor | Poor |
| 11.6 | Poor | Poor | Poor | Poor | Poor | Poor | Poor | Poor | Poor | Poor | Poor |

As illustrated in Table 5 and Table 6, in both cases where the inner peripheral side diffusion layer 103a of the battery can forming steel plate 100 was the iron and nickel diffusion layer and was the iron and nickel-cobalt alloy diffusion layer, satisfactory results were obtained in both the leakage resistance and the discharge characteristics when the average number of the crystal grains of the base material steel plate 102 was in a range of 12.3 to 14.0 and the thickness of the inner peripheral side plated layer 103 before the heat diffusion treatment (FIG. 3) was in a range of 0.5 to 2.0 μm.

In the case where the inner peripheral side diffusion layer 103a of the battery can forming steel plate 100 was the iron and nickel-cobalt alloy diffusion layer, the discharge performance is significantly improved without losing the leakage resistance when the average number of the crystal grains of the base material steel plate 102 was in a range of 12.3 to 14.0 and the thickness of the inner peripheral side plated layer 103 before the heat diffusion treatment (FIG. 3) was in a range of 1.5 to 2.0 μm.

It should be noted that when the average number of the crystal grains of the base material steel plate 102 exceeds 14.0, an extension of the base material steel plate 102 becomes worse to make the presswork (deep drawn presswork) difficult. Therefore, from the aspect of productivity, it is preferred to have the average number of the crystal grains of the base material steel plate 102 in a range of 12.3 to 14.0.

It has been confirmed that it is possible to achieve the alkaline battery in which both the leakage resistance improvement and the heavy load discharge performance improvement are provided by the following method. As the base material steel plate 102 of the battery can forming steel plate 100, one that has the average number of the crystal grains per 0.25 mm² unit area of equal to or more than 12.3 is used, the inner peripheral side plated layer 103 (nickel plated layer or nickel-cobalt alloy plated layer) is formed with a thickness of 0.5 to 2.0 μm on a surface on the side that is the inner surface of the positive electrode can 11 of the base material steel plate 102, and the inner peripheral side diffusion layer 103a (iron and nickel diffusion layer or iron and nickel-cobalt alloy diffusion layer) is formed by performing the heat diffusion treatment.

Similarly, it has been confirmed that it is possible to achieve the alkaline battery further superior in the heavy load discharge performance without losing the leakage resistance by the following method. As the base material steel plate 102, which is the base material of the battery can forming steel plate 100, one that has the average number of the crystal grains per 0.25 mm² unit area of equal to or more than 12.3, the inner peripheral side plated layer 103 (nickel-cobalt alloy plated layer) is formed with a thickness of 1.5 to 2.0 μm on a surface on the side that is the inner surface of the positive electrode can 11 of the base material steel plate 102, and the inner peripheral side diffusion layer 103a (iron and nickel-cobalt alloy diffusion layer) is formed by performing the heat diffusion treatment.

The above-described embodiment is illustrative and does not limit this disclosure. Thus, numerous additional modifications and variations are possible in light of the above teachings. It is therefore to be understood that, within the scope of the appended claims, this disclosure may be practiced otherwise than as specifically described herein.

What is claimed is:

1. A steel plate for forming a battery can to be formed into the battery can by presswork, the steel plate for forming the battery can comprising:

an iron and nickel diffusion layer or an iron and nickel-cobalt alloy diffusion layer formed by forming a nickel plated layer or a nicker-cobalt alloy plated layer with a thickness of 0.5 to 2.0 μm on an inner surface of a battery can of a steel plate as a base material, and subsequently performing heat diffusion treatment on the nickel plated layer or the nickel-cobalt alloy plated layer, wherein an average number of crystal grains per 0.25 mm² unit area of the steel plate as the base material is equal to or more than 12.3 and equal to or less than 14.0.

2. The steel plate for forming the battery can according to claim 1, comprising:

an iron and nickel-cobalt alloy diffusion layer formed by forming a nickel-cobalt alloy plated layer with a thickness of 1.5 to 2.0 μm on the inner surface of the battery can of the steel plate as the base material, and subsequently performing the heat diffusion treatment on the nickel-cobalt alloy plated layer, wherein the average number of the crystal grains per 0.25 mm² unit area of the steel plate as the base material is equal to or more than 12.3.

3. An alkaline battery configured by including a battery can in a shape of a cylinder with a closed bottom, the battery can being configured by using the steel plate for forming the battery can according to claim 1, the alkaline battery comprising:

a positive electrode can;

a positive electrode mixture formed into a hollow cylindrical shape disposed coaxial with the positive electrode can, inside the positive electrode can;

a separator housed in the positive electrode can;

a negative electrode mixture filling in an inner peripheral side of the separator;

a negative electrode current collector inserted into the negative electrode mixture;

a negative electrode terminal plate disposed to an opening of the positive electrode can; and an alkaline electrolyte.

* * * * *